United States Patent [19] Mori

[11] Patent Number: 5,042,459
[45] Date of Patent: Aug. 27, 1991

[54] HEAT ACCUMULATOR ELEMENT

[75] Inventor: Masahiro Mori, Tokyo, Japan

[73] Assignees: Zenshin Electric Power Engineering Inc.; The Furukawa Electric Co., Ltd., both of Tokyo, Japan

[21] Appl. No.: 413,714

[22] Filed: Sep. 28, 1989

Related U.S. Application Data

[63] Continuation-in-part of Ser. No. 236,208, Aug. 25, 1988, abandoned.

[30] Foreign Application Priority Data

Aug. 25, 1987 [JP] Japan .................................. 62-211058

[51] Int. Cl.$^5$ ............................................ F24H 7/00
[52] U.S. Cl. ...................................... 126/400; 122/35; 126/204
[58] Field of Search ................... 122/35; 126/204, 205, 126/207, 400, 296

[56] References Cited

U.S. PATENT DOCUMENTS 3,720,198  3/1973  Laing et al. ........................ 126/400
4,220,196  9/1989  Gawron et al. ................. 126/400 X

FOREIGN PATENT DOCUMENTS 281730   7/1928  Canada .
  33516   8/1933  Canada .
 874776   7/1971  Canada .
1117039   1/1982  Canada .
1207139   7/1986  Canada .
3005450   8/1981  Fed. Rep. of Germany .
3102869   9/1982  Fed. Rep. of Germany .
3125463   1/1983  Fed. Rep. of Germany .
2476809   8/1981  France ............................. 126/400
   6500   of 1893  United Kingdom ................ 126/204

Primary Examiner—Edward G. Favors

[57] ABSTRACT

A heat accumulator element comprises a container containing water sealed therein, the inside of the container being provided with a gas phase. Heat is directed at the outer surface of the container and accumulated in the liquid as sensible heat, and the volume change of the liquid caused by a change in the temperature is absorbed by the gas phase, so as to reach an accumulating temperature up to about 300° C.

13 Claims, 2 Drawing Sheets ically available is about 200 kg).
HEAT ACCUMULATOR ELEMENT This application is a continuation-in-part of application Ser. No. 07/236,208 filed on Aug. 25, 1988 abandoned.

BACKGROUND OF THE INVENTION

1. Field of the Invention

The present invention relates to an element for a heat accumulator that utilizes off-peak power to store heat that will be used, for example, for cooling and heating during the daytime.

2. Description of the Prior Art

It is quite important to create a demand for off-peak power to improve utilization of power generation facilities and to level the load of power generation facilities during the day.

As a method of using off-peak power during the daytime, a method of accumulating heat in a heat accumulator at a high-temperature is known. Such a heat accumulator uses a magnesite brick whose major component is magnesia, or a brick whose major component is iron oxide. In an apparatus using the brick as a heat-accumulating source, a heat-accumulating type heater can be mentioned. Such heat-accumulating type heaters are remarkably popular, particularly, for example, in West Germany, but in Japan they are used only in primary schools, homes for the aged, and hospitals.

However, while the brick used in such conventional heat accumulators can advantageously accumulate heat up to about 600° C., which is a high heat accumulating capacity and about 6 times that of water per unit of volume, such a brick has the defect that the weight per unit of heat capacity is high, because the specific gravity thereof is as high as 3.0 to 5.0. Therefore, the total weight of the above-discussed heat-accumulating type heater using a heat accumulator employing a conventional brick is large (for example, the weight of one commercially available is about 200 kg). Accordingly, it is unsatisfactory for use in the home, for example, in view of problems in installation and mobility.

BRIEF SUMMARY OF THE INVENTION

The present invention has been accomplished taking the above situation into consideration, and the object of the present invention is to provide a heat accumulator element that enables high-temperature heat to be accumulated, and that is light enough to be used in the home.

Another object of the present invention is to provide a heat accumulator element which has larger heat accumulating capacity, but is compact and light.

The above and other objects, features, and advantages of the invention will become more apparent in the detailed description and drawings. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

According to the present invention, there is provided a heat accumulator element which comprises a container in which a liquid is sealed, being provided with a gas phase that can absorb the volume change of the water caused by a change in the temperature of the water. Water is one of the substances having highest specific heat.

It is desirable that said container made of metal is a pressure resistance container. Further, it is preferable that said gas phase is composed of air or an inert gas, such as $N_2$, Ar, He and that the vapor of the water is acceptable. Herein term "inert gas" means a gas inert in the system, or inert against water. Of these gases air is more preferable in view of economy.

In the present invention, when the container is heated, the volume of the water changes due to the change in the temperature of the liquid contained therein, and at the same time the gas phase in the container absorbs the change in the volume of the water.

According to the present invention, the inside of a container in which water is sealed is provided with a gas phase that can absorb the change in the volume of the water caused by a change in the temperature of the water. Therefore, the accumulation of high-temperature heat or low-temperature heat can be carried out by heating or cooling the water while keeping the change in the internal pressure suppressed. Since the heat accumulator element itself can be made lightweight and compact, it can be used in such a way that multiple heat accumulator elements are arranged in combination or separately with each other for air-conditioning or heating water in the home.

Figure 1:
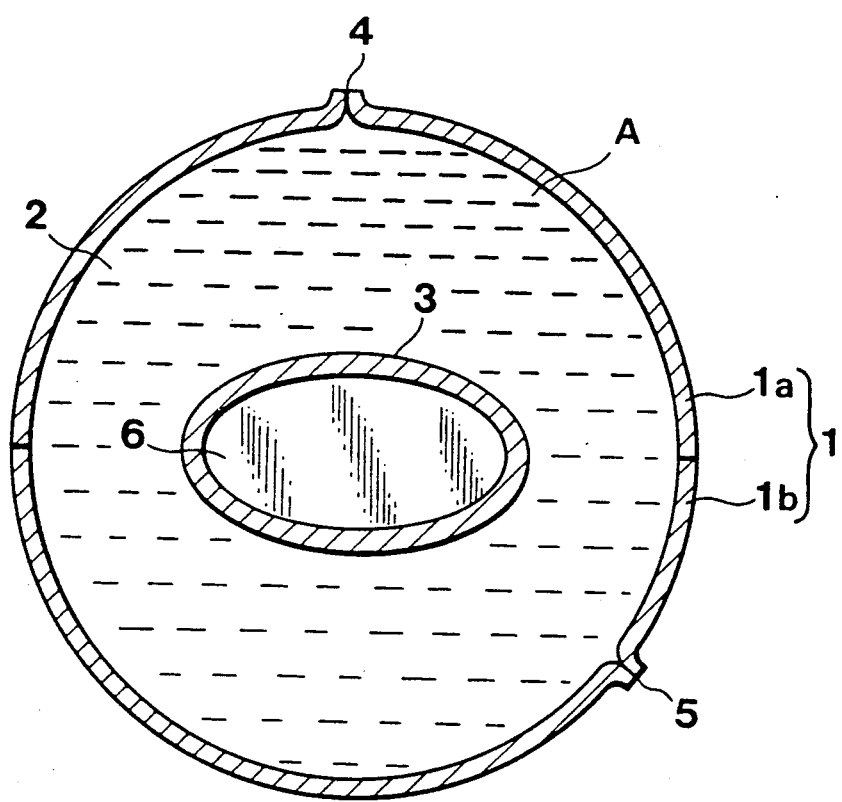
FIG. 1 is a cross-sectional view of an embodiment of the heat accumulator element of the present invention.

Referring to the drawings for a more complete understanding of the invention, FIG. 1 shows an embodiment of the present invention, wherein reference numeral 1 indicates a metal sphere (container).

The metal sphere (1) is made of a thin plate of stainless steel or the like that is formed into a round shape, and comprises a hemispherical sphere upper part (1a) and a hemispherical sphere lower part (1b). A sphere (2) is formed having a hollow structure. The inside sphere (2) is provided with a flexible bag (3). Water (A) that will act as a heat accumulating source is sealed between the bag (3) and the inner wall of the sphere (1). The outer surface of the sphere (1) is formed with a hole (4) through which the water (A) will be injected into the inside sphere (2), and a hole (5) through which the air in the inside sphere (2) will be withdrawn. As illustrated in FIG. 1, the holes (4) and (5) are sealed.

The bag (3) is made of a thin plate of metal or heat-resistant macromolecular material that is formed into a hollow structure in the shape of a pouch, and an air layer (6) is contained therein. The air layer (6) can absorb the change in the volume of the water caused by a change in the temperature of the water (A), so that the internal pressure of the inside sphere (2) may be kept constant.

Although the temperature of the water will usually not rise over 100° C., the boiling point of water, since the water (A) is sealed in the inside sphere (2), the water (A) would not vaporize but can increase in temperature over 100° C., to about 300° C. High-temperature heat accumulation is thereby allowed.

As for the size of the metal sphere (1), the smaller the sphere (1), the better it is for being lighweight and securing a suitable quantity of energy per unit. The size of the metal sphere (1) may be selected arbitrarily in the range from that of a ping-pong ball to that of a tennis ball. As for the weight of the heat accumulating body, if it has, for example, the size of a tennis ball, it will weigh on the order of 300 to 400 g (it will vary depending on the type or the thickness of the metal sphere (1)), which is very light.

Now, a method of assembling the heat accumulator element having the above-described construction and the operation thereof will be described.

To assemble the heat accumulator element, first the bag (3) wherein the air (6) is sealed is placed in the sphere lower part (1b), the opening of the sphere lower part (1b) is engaged with the opening of the sphere upper part (1a), and the engaged surfaces are welded. Then, while the air in the inside sphere (2) of the sphere (1) thus-formed is removed through the hole (5), the water (A) is introduced into the inside sphere (2) through the hole (4), and thereafter the holes (4) and (5) are sealed.

When many such assembled heat accumulator elements are arranged in combination or separately with each other and heated from the outside of the sphere (1) by a sheathed heater or the like, the temperature of the water (A) in each heat accumulator element rises, the pressure in the inside sphere (2) also rises, and the volume of the water (A) increases. For example, if the water temperature in the inside sphere (2) rises to 374.15° C., the pressure in the inside sphere (2) becomes 225.65 atm and the volume of the water (A) expands to 3.05 times that of the water (A) at normal temperature. The increase in the volume of the water (A) caused by the expansion is absorbed by the shrinkage of the bag (3). If the water temperature in the inside sphere (2) lowers, the volume of the water (A) decreases and a negative pressure will arise between the bag (3) and the water (A) whereby the bag (3) will expand correspondingly.

Thus, with the increase in the internal pressure due to the expansion of the volume of the water (A) suppressed, the water temperature of the inside sphere (2) can be increased to about 350° C., and the accumulation of heat can be accomplished. Since the heat accumulator element is lightweight, as mentioned above, if multiple such heat accumulator elements are used as the heat-accumulating source for a heat-accumulating type heater, the total weight may be small enough to allow its use in the home.

The volume of the bag (3) when high-temperature heat accumulation is effected will be determined on the basis, for example, of the volume of the expansion of the water (A). The pressure resistance capacity against the internal pressure will be determined on the basis of the temperature to be utilized, the material or thickness of the sphere (1), or the volume of the bag (3), and the like.

In this example, since inexpensive water is used as a heat accumulating source, the initial cost may be lowered. In addition, once the water (A) is sealed, it is maintenance free, and therefore cost for maintenance, or the like is not required.

Figure 2:
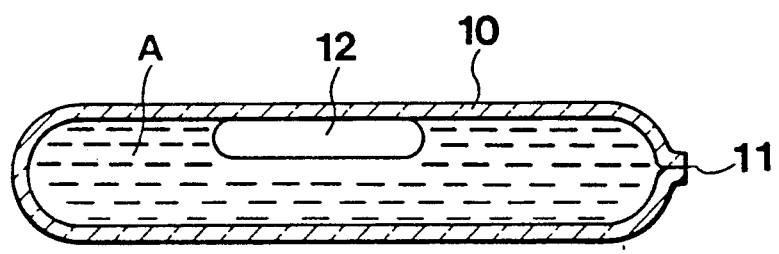
FIG. 2 is a cross-sectional view of another embodiment of the heat accumulator element of the present invention.

FIG. 2 illustrates another embodiment of the present invention, and reference numeral 10 indicates a pressure resistant metal body (container). The metal body (10) is formed into a hollow structure in the shape of a cylinder, such as an ampule. Similarly to the above embodiment, water (A) is sealed within the metal body (10). This water (A) will serve as a heat-accumulating source. A gas phase (air layer) (12) for absorbing the change in the volume of the water (A) is also provided. An injection hole (11) for the water (A) is formed at one end of the metal body (10), and in the illustrated example, the injection hole (11) is sealed.

It is found that when the water (A) in the metal body (10) is gradually heated, after the temperature of the water (A) reaches 309° C. (i.e., the pressure is 100 atm), the expansion coefficient of the water (A) increases and the heat accumulating amount decreases reversely (because the volume of the water (A) that can be contained in the metal body (10) decreases). Therefore, it is considered optimum that the heat accumulating temperature is in the range of 100° C. to 300° C. when water is used. Since the object of the present invention resides in providing a heat accumulator element that is lightweight, compact, and suitable to be used in the home, the object can be well attained if the heat accumulating temperature is up to about 300° C.

According to this embodiment, when the water (A) is heated and the volume of the water (A) increases, since the increase in the volume is absorbed by the gas phase (12), the rise in the internal pressure can be suppressed, and therefore high-temperature heat accumulation becomes possible.

Further, since the heat accumulator element is smaller and in the shape of a column (the length, diameter, and thickness of the metal body are 50 mm, and 1.8 mm, respectively), and is lighter in weight, many such heat accumulator elements can be arranged for use as a heat accumulating source, which will constitute a compact heat accumulating type heater for domestic use.

Since the metal body (10) can be formed integrally, it can be mass-produced, and the production cost may be low.

Figure 3:
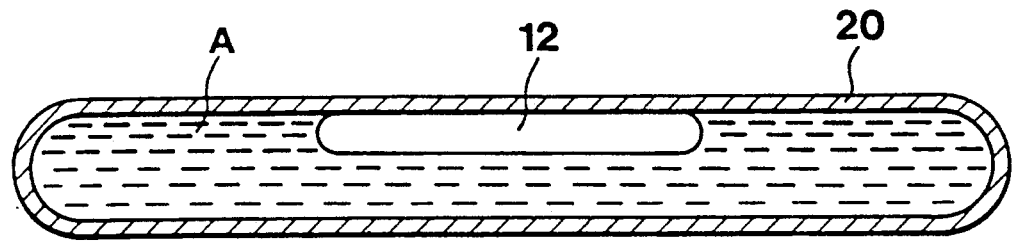
FIG. 3 is a cross-sectional view of another embodiment of the heat accumulator element of the present invention.

FIG. 3 illustrates yet a further embodiment of the present invention, and reference numeral 20 indicates a metal pipe (container).

The metal pipe (20) is made of a thin plate of stainless steel, copper or the like that is formed into the shape of an elongate rod or pipe. Water (A) and a gas phase (air layer) (12) are sealed in the metal pipe (20). The dimensions of the metal pipe (20) in this embodiment are such that the length is 400 to 2000 mm, the diameter is 12.7 mm, and the thickness of the plate is 0.5 mm. Both longitudinal ends of the pipe are sealed.

The operation and the effect of this example are similar to those of the preceding embodiments, and therefore they are omitted.

According to the present invention, the heat accumulator element utilizes the sensible heat of water, which fact distinctly differs from the conventional ones utilizing latent heat. Compared with the utilization of latent heat of water, the utilization of sensible heat of this invention is shown below.

|  | This invention (Sensible heat) | For comparison (Latent heat) |
| --- | --- | --- |
| Temperature utilized | 230~80° C. | 0~0° C. |
| Calories utilized | 156.5 kcal/kg | 79.8 kcal/kg |

Having described the invention as related to the embodiment, it will be obvious that the invention not be limited by any of the details of the description, unless otherwise specified, but rather be construed broadly within its spirit and scope as set out in the accompanying claims.

What is claimed is:

1. A high temperature heat accumulator element which comprises a pressure resistance container made of heat conductive metal containing generally pure water sealed therein, said heat accumulator element utilizing sensitive heat of the water and avoiding phase change of the water, the inside of the container being provided with means including a gas phase for absorbing the changes in the volume of the water caused by a change in temperature of the water and for permitting the temperature of the water in the container to rise to about 300° C.

2. The heat accumulator element as claimed in claim 1, wherein the shape of said container is rod-like or spherical.

3. The heat accumulator element as claimed in claim 1, wherein the gas phase comprises air or an inert gas selected from $N_2$, He, $CO_2$, and CO.

4. A high temperature heat accumulator element which comprises a pressure resistance container made of heat conductive metal containing water sealed therein, said heat accumulator element utilizing sensitive heat of the water and avoiding phase change of the water, the inside of said container being provided with a gas phase for absorbing the changes in the volume of the water caused by change in temperature of the water, the gas phase is located with a sealed compartment within the metal container, the sealed compartment being in contact with the water.

5. The heat accumulator element as claimed in claim 4, wherein the sealed compartment is flexible to accommodate changes in volume of the water due to changes in water temperature to ensure that said water remains in a liquid phase.

6. The heat accumulator element as claimed in claim 5, wherein the sealed compartment is generally located in the middle of the metal container and is surrounded by the water.

7. The heat accumulator element as recited in claim 6, wherein the metal container has a generally spherical shape.

8. The heat accumulator element as recited in claim 1, wherein the metal container has a generally spherical shape.

9. The heat accumulator element as recited in claim 1, wherein the metal container has a water injection opening and an air release opening defined therein, both of said openings being sealable.

10. The heat accumulator element as recited in claim 1, wherein the water is in a liquid phase and wherein the gas phase is separate from the liquid phase and said gas phase accommodates changes in volume of the water due to changes in water temperature to thereby ensure that the water remains in the liquid phase.

11. The heat accumulator element as recited in claim 10, wherein the metal container has a generally cylindrical shape with a sealable injection hole at one end thereof.

12. The heat accumulator element as recited in claim 10, wherein the metal container is sealed and is a generally cylindrical shape.

13. The heat accumulator element as recited in claim 1, wherein the water is in a liquid phase and wherein the gas phase is separate from the liquid phase and said gas phase accommodates changes in volume of the water due to changes in water temperature to thereby ensure that the water remains in the liquid phase.

* * * * *